US010262494B2

(12) United States Patent
McBurnie

(10) Patent No.: US 10,262,494 B2
(45) Date of Patent: Apr. 16, 2019

(54) GAMING SYSTEM AND METHOD

(71) Applicant: The Baccarun Corporation Pty Ltd, Prahran, Victoria (AU)

(72) Inventor: Dougall McBurnie, Prahran (AU)

(73) Assignee: The Baccarun Corporation Pty Ltd., Prahan, Victoria (AU)

( * ) Notice: Subject to any disclaimer, the term of this patent is extended or adjusted under 35 U.S.C. 154(b) by 223 days.

(21) Appl. No.: 15/210,344

(22) Filed: Jul. 14, 2016

(65) Prior Publication Data

US 2017/0018138 A1 Jan. 19, 2017

Related U.S. Application Data

(60) Provisional application No. 62/193,842, filed on Jul. 17, 2015.

(51) Int. Cl.
*G06F 17/00* (2006.01)
*G07F 17/32* (2006.01)

(52) U.S. Cl.
CPC ........ *G07F 17/323* (2013.01); *G07F 17/3211* (2013.01); *G07F 17/3241* (2013.01); *G07F 17/3244* (2013.01); *G07F 17/3293* (2013.01)

(58) Field of Classification Search
None
See application file for complete search history.

(56) References Cited

U.S. PATENT DOCUMENTS 8,177,634 B2 * 5/2012 Herrmann .............. G06Q 30/02 463/25
2006/0100009 A1 * 5/2006 Walker .................... G07F 17/32 463/25
2006/0178187 A1 * 8/2006 Walker .................... G07F 17/32 463/16
2007/0087818 A1 * 4/2007 Walker .................... G07F 17/32 463/25
2008/0305856 A1 * 12/2008 Walker .................... G07F 17/32 463/25
2009/0264190 A1 * 10/2009 Davis ...................... G07F 17/32 463/26
2009/0305765 A1 * 12/2009 Walker ................ G07F 17/3223 463/20
2011/0183753 A1 7/2011 Acres et al.
2015/0141112 A1 5/2015 McDermott et al.

OTHER PUBLICATIONS

European Search Report for EP Application No. 16179784.0 dated Jan. 23, 2017 (9 pages).

* cited by examiner

*Primary Examiner* — Paul A D'Agostino
(74) *Attorney, Agent, or Firm* — Merchant & Gould P.C.

(57) ABSTRACT

A gaming system including: a wager receiver for receiving a plurality of wagers, each wager identifying a corresponding predicted sequence of outcomes of game outcome events, each of the predicted sequences of outcomes being stored in a wager database; an outcome generator for generating a results sequence of game outcome events, the game outcome events of the results sequence being generated sequentially and displayed on one or more displays; a results comparator for comparing the results sequence with the predicted sequences of outcomes stored in the wager database, and generating a win signal if the results sequence matches one or more of the predicted sequences stored in the wager database; and a win notifier for generating a win message for displaying a win indication on the displays in response to receiving the win signal.

20 Claims, 13 Drawing Sheets

1600

GAMING SYSTEM AND METHOD

CROSS REFERENCE

This application claims benefit of U.S. Provisional Application No. 62/193,382, filed 17 Jul. 2015 and which application is incorporated herein by reference. To the extent appropriate, a claim of priority is made to the above disclosed application.

TECHNICAL FIELD

The present invention generally relates to gaming systems and gaming methods that may be used, for example, at specialised gaming venues such as casinos, pubs, clubs and boats that allow gaming.

BACKGROUND

Casinos or other specialised gaming venues generally provide a variety of gaming mechanisms for use by players. For many years, such gaming venues have provided both table games, based around tables, and computer-implemented games, based on computer systems and electronic microprocessors. These games are designed to encourage game play, and the placement of wages or bets which relate to the outcome of the game.

More recently, gaming machines (being specialised hardware for executing games on a computer processor and displaying results of a video display unit) have been connected to each other using computer networks to form gaming systems with new game features, including pluralities of gaming machines in groups (or "banks"). These new game features include jackpot features that enable each of the wagers placed on the gaming machines connected to the network to contribute to a common jackpot pool. Networked gaming machines also allow for player identification, as card readers installed in the gaming machines can read player cards and retrieve player profiles from a database over the computer network.

It is desired to provide an alternative or improved gaming system to increase player engagement, or to at least address one or more shortcomings of prior art gaming systems.

SUMMARY

In accordance with the present invention, there is provided a gaming system including:

a wager receiver for receiving a plurality of wagers, each wager identifying a corresponding predicted sequence of outcomes of game outcome events, each of the predicted sequences of outcomes being stored in a wager database;

an outcome generator for generating a results sequence of game outcome events, the game outcome events of the results sequence being generated sequentially and displayed on one or more displays;

a results comparator for comparing the results sequence with the predicted sequences of outcomes stored in the wager database, and generating a win signal if the results sequence matches one or more of the predicted sequences stored in the wager database; and a win notifier for generating a win message for displaying a win indication on the displays in response to receiving the win signal.

The present invention also provides a gaming method including steps of:

receiving a plurality of wagers, each wager identifying a corresponding predicted sequence of outcomes of game outcome events, each of the predicted sequences of outcomes being stored in a wager database;

generating a results sequence of game outcome events, the game outcome events of the results sequence being generated sequentially and displayed on one or more displays;

comparing the results sequence with the predicted sequences of outcomes stored in the wager database, and generating a win signal if the results sequence matches one or more of the predicted sequences stored in the wager database; and generating a win message for displaying a win indication on the displays in response to receiving the win signal.

The present invention also provides an electronic gaming machine including:

a wager receiver for receiving a plurality of wagers, each wager identifying a corresponding predicted sequence of outcomes of game outcome events, each of the predicted sequences of outcomes being stored in a wager database;

an outcome generator for generating a results sequence of game outcome events, the game outcome events of the results sequence being generated sequentially and displayed on one or more displays;

a results comparator for comparing the results sequence with the predicted sequences of outcomes stored in the wager database, and generating a win signal if the results sequence matches one or more of the predicted sequences stored in the wager database; and a win notifier for generating a win message for displaying a win indication on the displays in response to receiving the win signal.

The present invention also provides non-transitory computer-readable storage with instructions configured to perform the gaming method.

BRIEF DESCRIPTION OF THE DRAWINGS

Some embodiments of the present invention are hereinafter described, by way of example only, with reference to the accompanying drawings, in which.

DETAILED DESCRIPTION

In at least one embodiment, the present invention provides a mechanism for players to place wagers on a sequence of game outcome events. The events in the sequence are generated sequentially, i.e., one by one, and thus the outcome of the wager is not determined to be a winning outcome until the same number of game outcome events have occurred as the number of predicted outcomes in the wager. A game outcome event could be an event that occurs during a game method, and need not be an ultimate winning or losing event. The game outcome events can be events in a "standard game" that follows standard rules (including Baccarat rules), thus, in embodiments, the present invention provides methods/processes and systems for matching a player-selected prediction (associated with the wager) with outcomes of a plurality of plays of a standard game, in particular on a sequence or "run" of the plays. The number of plays in the sequence or run is selected in the prediction, and can include a sequence of 4, or 8, or 16 plays, or any sequence between 2 and 32 plays. The prediction includes a corresponding plurality of predicted outcomes. Each predicted outcome can be selected independently from the possible outcomes of the game, or a group of predicted outcomes can be selected as a pre-defined subsequence. For example, if a game has possible outcomes of A, B and C for a game event, and a prediction is generated for 8 plays, the prediction can be generated by selecting each of the 8 predicted events individually. Alternatively, a group of 4 outcomes can be selected from a pre-defined subsequence of the respective lengths, e.g., AAAA, BBBB, CCCC, ABCC, etc. The pre-defined subsequences can be pre-selected by the player, as described hereinafter, and may be referred to as "nominated patterns". In at least one embodiment, the present invention provides mechanisms for communicating directly with the players.

Figure 1:
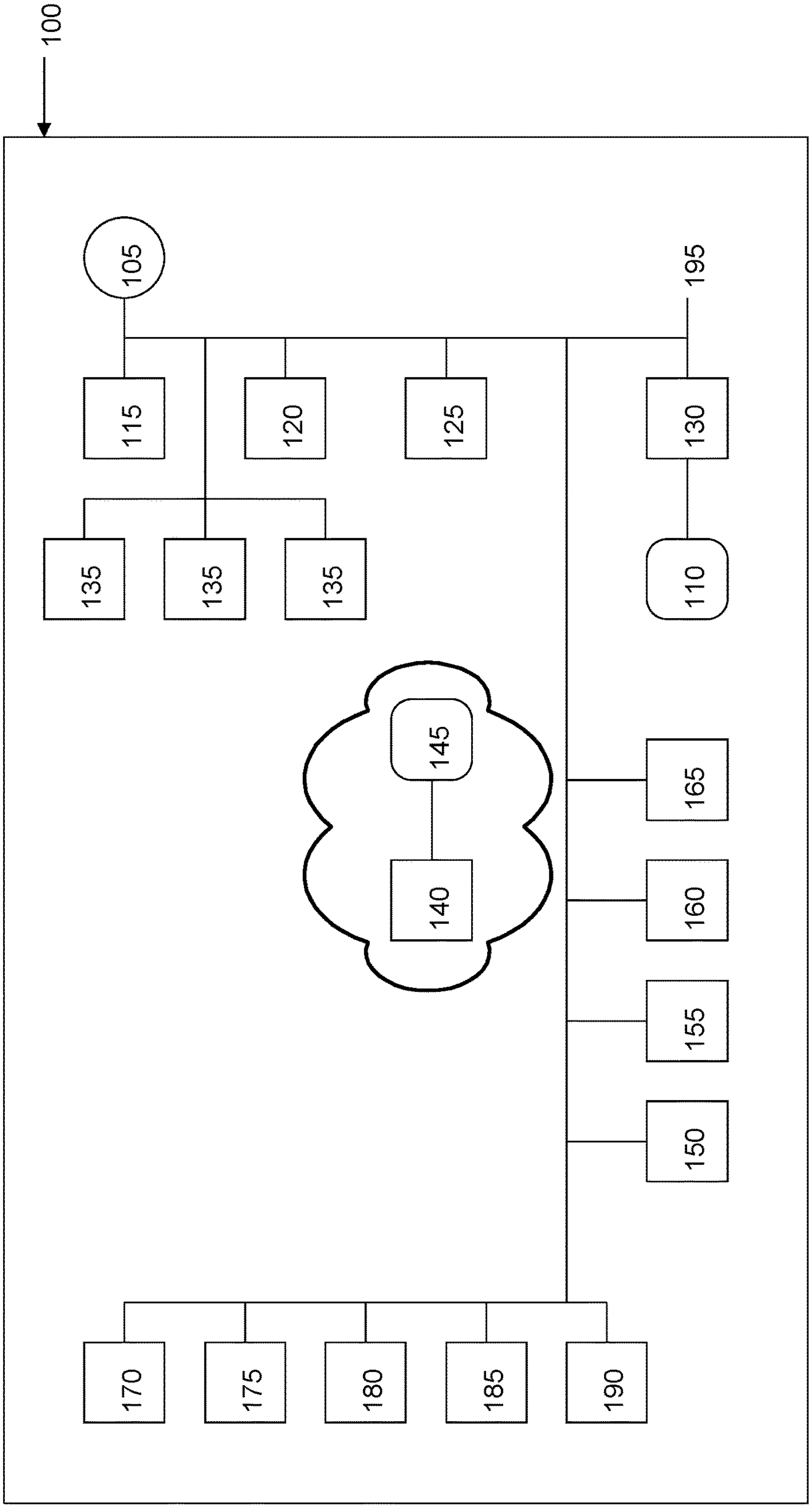
FIG. 1 is a block diagram of a gaming system.

As shown in FIG. 1, a gaming system 100 in a specialized gaming venue includes one or more wager receivers (for receiving a plurality of wagers), including: at least one Bet Kiosk 155 that is accessible directly by a player (also known as a "customer"), at least one Bet Terminal 150 that is accessible directly by the customer, and one or more System Computer Devices 135 that is accessible indirectly by a customer through an administrator (which can be a cashier of the specialized gaming venue). The wager receivers can include one or more Hotel-Room Input Devices 190 (referred to as "Hotel TVs"). To access the System Computer Devices 135, the gaming system 100 includes at least one Game Card 160 for the customer to complete and provide to the cashier with funds for one or more bets. Each wager (or "bet") becomes active if the cashier confirms the bet via the one or more System Computer Devices 135, or the customer enters it on a bet device, including the Bet Kiosk 155, the Bet Terminal 150, an Interactive TV 185 or the Hotel TV 190. The active bet represents and identifies a corresponding predicted sequence of outcomes of game outcome events. The gaming system 100 includes a plurality of Database Servers 105 with respective wager databases for storing each of the predicted sequences of outcomes. The system 100 generates a Bet Receipt 165, e.g., for a player from a cashier, on the successful placement of each wager.

The wager receivers are also player-information receivers that receive player information based on user input into a user input apparatus by the player or the administrator. The wager receiver associates the received player information with each wager. The player information includes: (i) authentication details, which are used by a player to communicate with the system and other players after placing a wager in an authenticated session, described hereinafter; (ii) contact information for the player; and (iii) player preferences selected by each player from game options in the gaming system 100. The player information is stored as player data in the Database Servers 105, including authentication data representing the authentication details, contact data representing the contact information, and preferences data representing the player preferences.

The player preferences include one or more values for the following game options: row display speed; card display speed; card squeeze on/off; betting patterns; number of games; amount per game; messages on/off; having player's details published/unpublished; and friends list (i.e., a list of friend identifiers). The player preferences data allow a player to store preferred game values, and select them for use in subsequent games. For example, a player can save and re-use a favorite betting pattern, and the gaming system 100 can make this available for re-selection when the player selects a new betting pattern during the gaming method. In another example, the player can select favorite game parameters, such as the card display speed, to be used by the gaming method.

As shown in FIG. 1, the gaming system 100 includes an Administration Server 130 (or "Admin Server") with an Administration Module 110 that communicates with the other components of the gaming system 100 to execute the overall gaming method. The Administration Server 130 includes machine-readable and machine-writeable computer memory where bets are stored using computer-readable electronic binary data: the bets include open bets, wining bets and losing bets, described hereinafter.

As shown in FIG. 1, the gaming system 100 includes a plurality of Game Servers 115 and a plurality of Card Servers 120. Each Card Server 120*a* . . . 120*n* of the Card Servers 120 includes machine-readable and machine-writeable computer memory where a virtual card deck is stored using computer-readable electronic binary data.

The number of Database Servers 105 is based on the expected system load and/or a determined level of redundancy, and can be different from the number of Game Servers 115 or Card Servers 120. There may be a minimum of two of each (Database Servers 105, Game Servers 115 or Card Servers 120) to provide for redundancy; however the system 100 can operate with only one of each. In an example, the system 100 can include 2 database servers, 3 card servers, and 4 game servers. The system 100 replicates data across the Database Servers 105, Card Servers 120 and Game Servers 115 so each type of server has the same data, thus providing scalability and availability: e.g., if one server crashes, the system 100 can still operate. Where there is a plurality of the Database Servers 105, a database management controller, e.g., programmed into the Database Servers 105, manages automatic load sharing and fail-over. Where there is a plurality of the Game Servers 115, or the Card Servers 120, one of these servers of each type is a primary server that replicates data across the other servers of that type, and if a request cannot be made to the primary server, it is re-sent to a secondary server of that type. Hereinafter, a reference to the Database Servers 105, the Game Servers 115 and the Card Servers 120 is a reference to the respective primary server, if it is available, and the respective secondary if the primary server is unavailable, etc.

As shown in FIG. 1, the gaming system 100 includes a plurality of display devices including Media Displays 170, Media Walls 175, Virtual Displays 180, Interactive TVs 185, the Hotel TVs 190 and Customer Devices 140. The display devices provide mechanisms for communicating directly with the players.

The gaming system 100 includes a plurality of Media Servers 125 in electronic communication with the plurality of display devices. The Media Servers 125 may be referred to as "social media and media servers" because they have the following functions: (1) storing media content to be published and broadcast to the display devices; and (2) publishing social-media-type feeds (also referred to as "media streams") that are integrated with content for the display devices on the internal network of the system 100. The Media Servers 125 publish customers' wins, and other customer content (including customer-to-customer messaging, and running updates on selected customers, including the approaching wins described hereinafter, e.g., "Billy has 6 of 7:1 more to win major prize"), on all selected ones of the connected display devices.

As shown in FIG. 1, the Customer Device 140 includes a mobile application that displays game results and received bets.

The components of the gaming system 100 are connected by an electronic gaming network 195 that provides electronic communication between the components based on known electronic protocols, including HTTP, HTTPS, TCPIP, and/or multicast and broadcast protocols.

Figure 2:
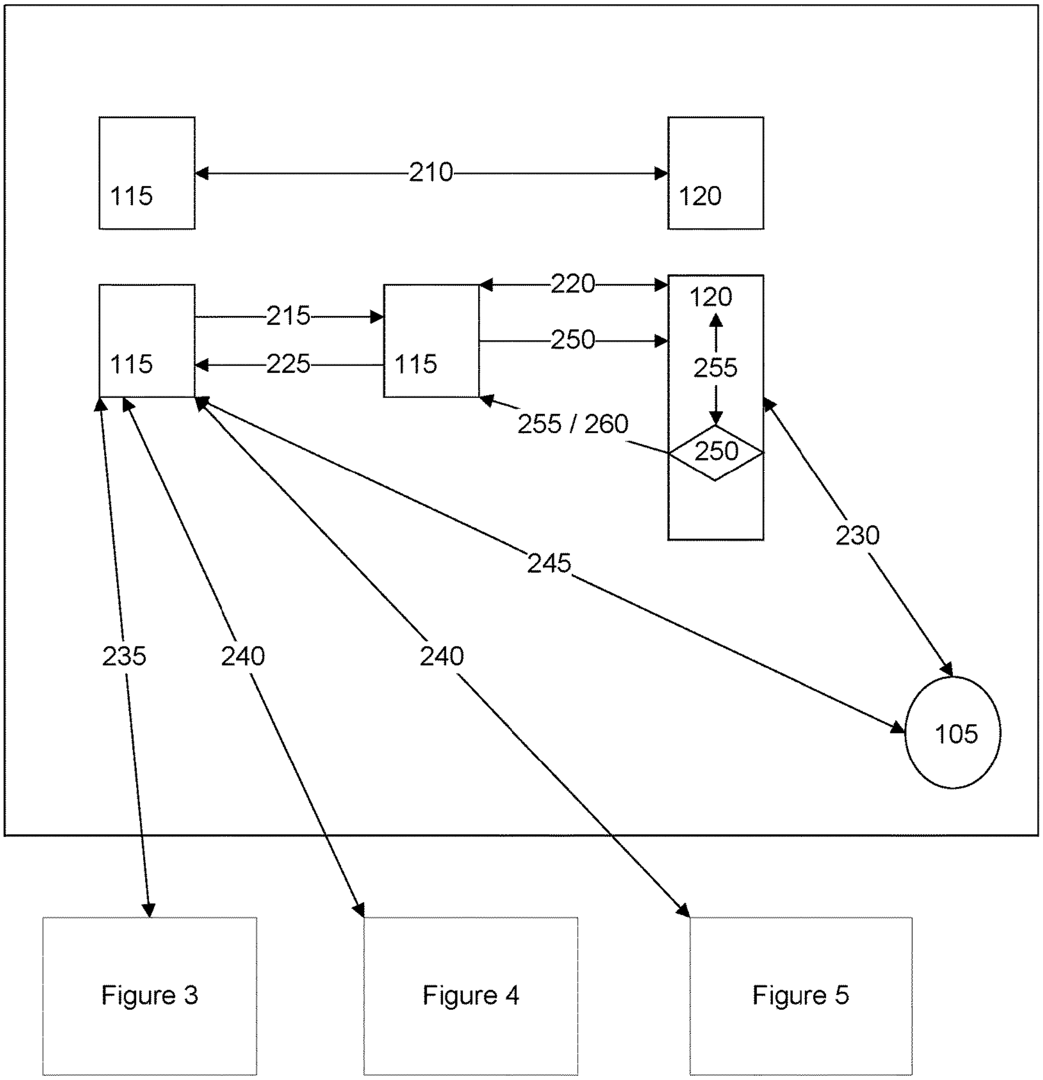
FIGS. 2 to 5 are a connection diagrams of the gaming system.

As shown in FIG. 2, the Game Servers 115 have internal calls to execute (or "perform") an Execute Game Process 215 and a Game Return Process 225.

As shown in FIG. 2, the Game Servers 115 and the Card Servers 120 are in communication to perform a Shuffle Deck Process 210, a Draw Card Process 220 (called by the Execute Game Process 215 on the Card Servers 120), and a Card Validation Process 250, described hereinafter. The Card Servers 120 and Database Servers 105 are in communication to perform a Post Game Process 230 described hereinafter. The Game Servers 115 are in communication with the Administration Server 130 to perform a Winning Bets Process 240 described hereinafter. The Game Servers 115 are in communication with the Database Servers 105 to perform a Post Display Game Process 245 described hereinafter.

Figure 3:
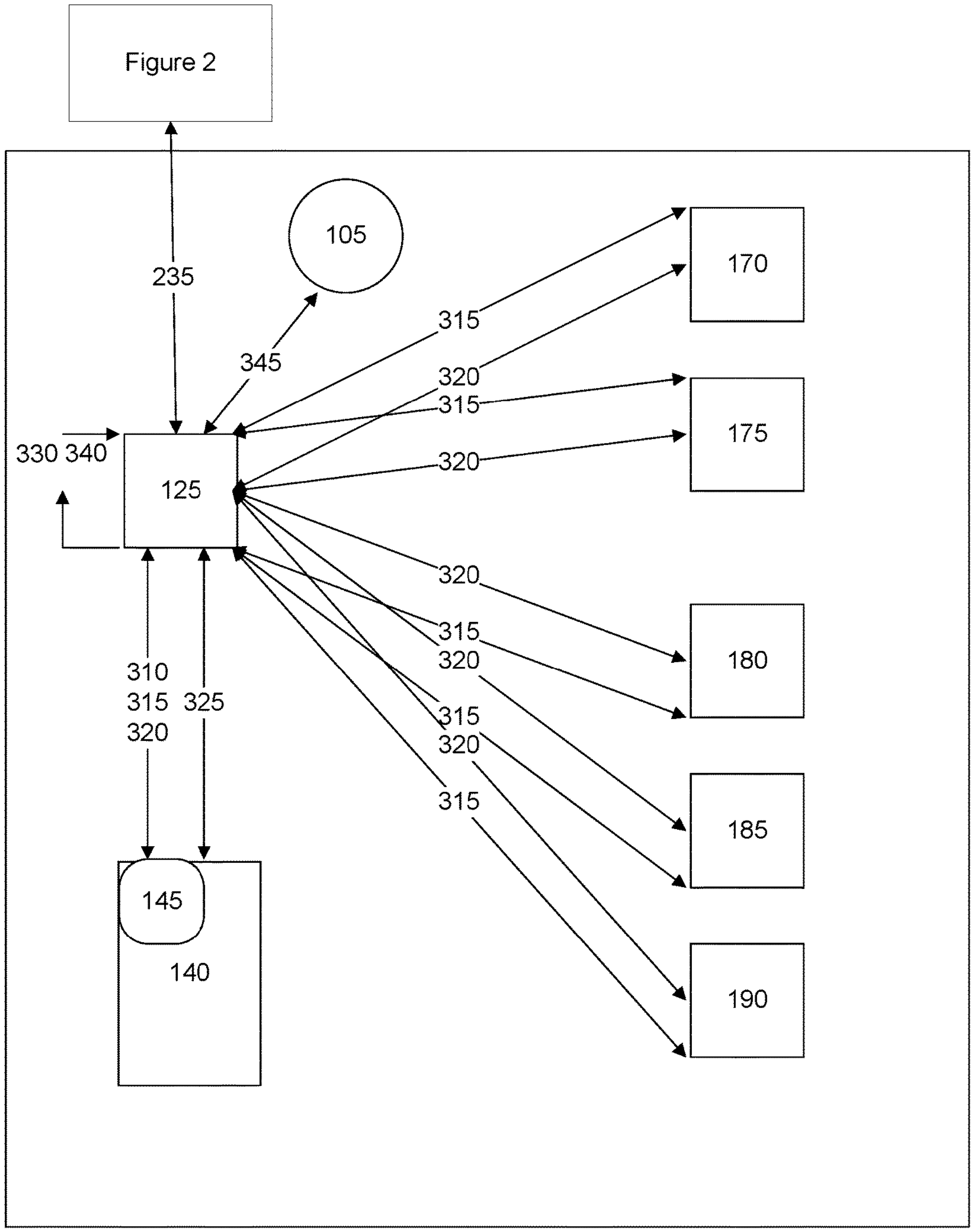

As shown in FIGS. 2 and 3, the Game Servers 115 are in communication with the Media Servers 125 to perform a Media Event Process 235 described hereinafter.

As shown in FIG. 3, the Media Servers 125 perform a plurality of media processes or "workflows", including a Post Customer Social Media Workflow 310, a Display Results Workflow 315, a Display Social Media Workflow 320, a validate Social Comment Workflow 330, a Processing Generated Media Workflow 340, and a Get-Post Media-Results Data Workflow 345. The Media Servers 125 perform these media processes through communication and interactions with the Customer Devices 140, the Mobile Applications 145, and the display devices 170, 175, 180, 185, 190.

In the Post Customer Social Media Workflow 310, a customer using the Mobile Application 145 on the Customer Device 140, the Bet Kiosk 155, or the Bet Terminal 150, can post a selected customer-generated message which includes text and/or an image or photograph. The process of posting the customer-generated message submits this to a queue on the Media Servers 125 that is stored in the Database Servers 105 following the Get-Post Media-Results Data Workflow 345 for subsequent processing by the Validate Social Comment Workflow 330.

In the Display Results Workflow 315, the Media Servers 125 use the Get-Post Media-Results Data Workflow 345 to retrieve the latest game result and file names. The Media Servers 125 then transmit the video and data to the various display devices 140, 170, 175, 180, 185 and 190 to display.

In the Display Social Media Workflow 320, the Media Servers 125 use the Get-Post Media-Results Data Workflow 345 to retrieve the validated customer-generated messages. The Media Servers 125 then transmit the associated video and data to the various display devices 140, 170, 175, 180, 185 for display.

In the Validate Social Comment Workflow 330, the customer-generated messages captured and stored in the Post Customer Social Media Workflow 310 are processed by a language rules engine to disable illegal/negative/inappropriate language and to accept appropriate ones of the customer-generated messages. Each of the customer-generated messages is processed individually by the language rules engine using a first in first out (FIFO) order. Any word that the engine identifies as having issues is then placed in a separate queue in the Database Servers 105 using the Get-Post Media-Results Data Workflow 345 for the administrator to review and either approve or decline manually. Photos posted are reviewed manually by the administrator to either approve or decline. When the customer-generated message and/or photograph is accepted, either manually or automatically, it is flagged as "validate" in the Database Servers 105, using the Get-Post Media-Results Data Workflow 345, and can be displayed by the Display Social Media Workflow 320.

In the Process Generate Media Workflow 340, the customer-generated messages received from the Game Server 115 are stored and converted into multi-media files to be displayed using the Display Results Workflow 315, and stored and updated in the Database Servers 105 using the Get-Post Media-Results Data Workflow 345.

In the Get-Post MediaResults Data Workflow 345, the Media Servers 125 get data from the Database Servers 105, and post data into the Database Servers 105, including saving the customer-generated message, saving a social media photo, and getting the results from the database.

Figure 4:
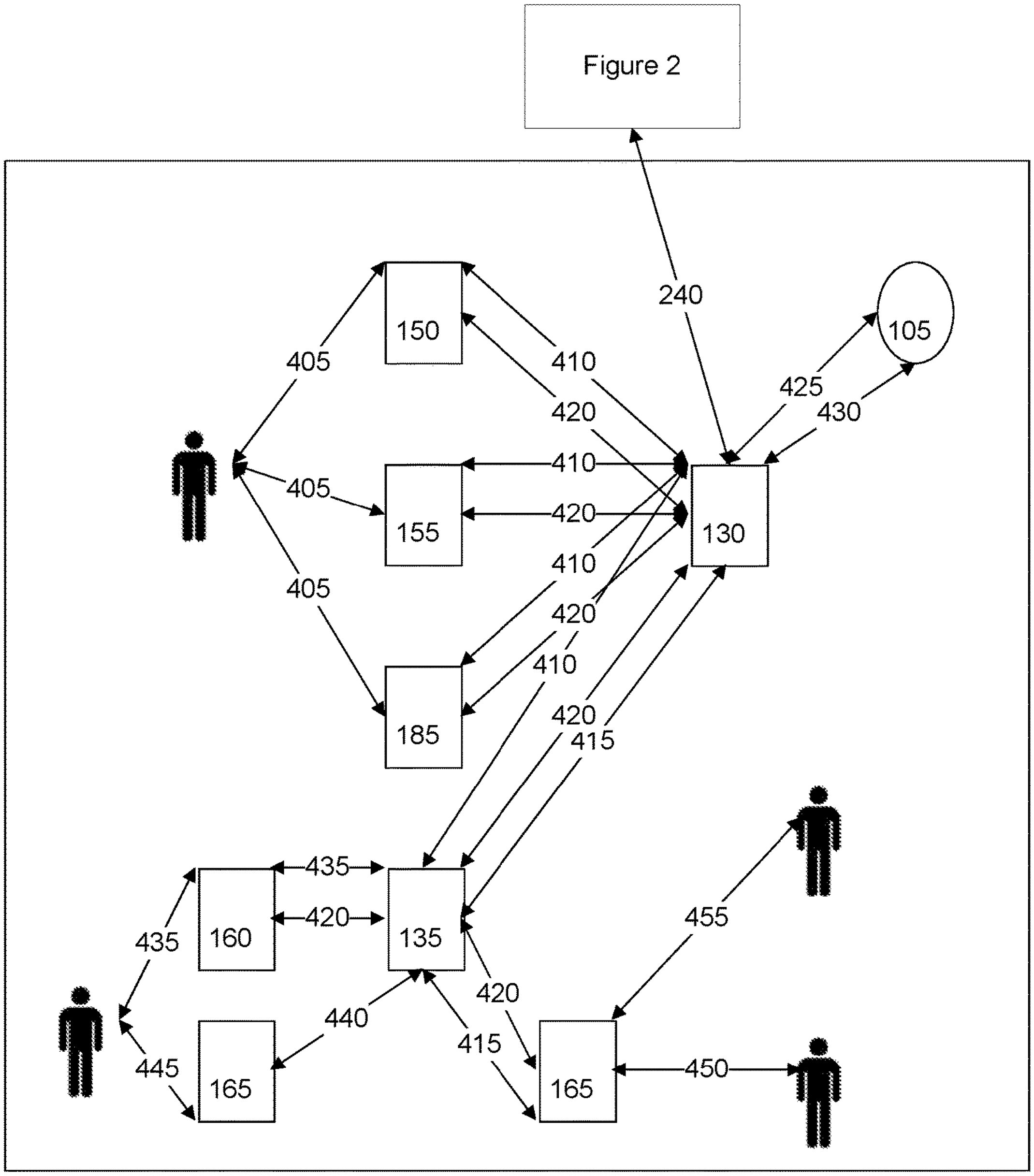

As shown in FIG. 4, the Admin Server 130 initiates a plurality of high level bet processes (or "workflows") including: a Bet Transaction Workflow 405, a Place Bet Workflow 410, a Void Bet Workflow 415, a Settle Bet Workflow 420, a Database Insert Bet ("DBInsertBet") Workflow 425, a Database Update Bet ("DBUpdateBet") Workflow 430, a Complete and Submit Game Card Workflow 435, a Generate Bet Receipt Workflow 440, a Get Bet Receipt Workflow 445, a Submit Void Bet Workflow 450, and a Submit Bet for Settlement Workflow 455.

In the Electronic Bet Transaction Workflow 405, an electronic bet transaction is initiated by a customer entering their bet selection and wagering amount into a selected bet device (including the Bet Kiosk 155, the Bet Terminal 150, an Interactive TV 185 or the Hotel TV 190). Once the selection criteria and wagering amount are entered and validated on the bet device, the bet device initiates Place Bet Workflow 410.

The Place Bet Workflow 410 is initiated by the bet devices on the Admin Server 130, which posts the bet data into the Database Servers 105 via the DBInsertBet Workflow 425.

A customer may void a bet under certain scenarios by providing the Bet Receipt 165 to the operator, and the operator using the System Computer Devices 135 to validate the bet can be voided, and then updating the void bet status by initiating the Void Bet Workflow 415 for the Admin Server 130, which in turn updates the void bet by calling the DBInsertBet Workflow 430.

A customer may settle a winning bet by providing the Bet Receipt 165 to the operator. The operator using the System Computer Devices 135 validates the bet is a winning bet, and then updates the status to paid by initiating the Settle Bet Workflow 420 for the Admin Server 130, which updates the bet status to be "paid" in the Database Servers 105 using the DBUpdateBet Workflow 430.

In the DBInsertBet Workflow 425, the Admin Server 130 receives validated bet data and inserts the data into the Database Servers 105.

In the DBUpdateBet Workflow 430, the Admin Server 130 receives validated bet data and updates the Database Servers 105.

The customer completes the Game Card 160 by marking their bet and wager and their player information on the Game Card 160. The customer provides the completed Game Card 160 to the operator (e.g., the cashier), who validates the Game Card 160 by using the Admin Server 130 on the System Computer Devices 135 in the Submit Game Card Workflow 435. The operator uses the System Computer Devices 135 to insert the validated bet by calling Place Bet Workflow 410 on the Admin Server 130, which inserts the bet into the Database Servers 105.

In the generate Bet Receipt Workflow 440, on successful processing of the Submit Game Card Workflow 435, the Admin Server 130, operating on the System Computer Devices 135, generates a valid Bet Receipt 165, which is printed and provided to the customer.

In the Get Bet Receipt Workflow 445, the Bet Receipt 165 is provided physically to the customer.

In the Submit Void Bet Workflow 450, the customer may void a bet under certain scenarios by providing the Bet Receipt 165 to the operator, and the operator using the System Computer Devices 135 to validate the bet can be voided, and then updating the void bet status by sending the Void Bet Workflow 415 to the Admin Server 130, which in turn updates the void bet by calling the DBUpdateBet Workflow 430

In the Submit Receipt for Settlement Workflow 455, the customer may settle a winning bet by providing the Bet Receipt 165 to the operator, and the operator using the System Computer Devices 135 to validate the bet is a winning bet, and then updating the status to "paid" by sending Settle Bet Workflow 420 to the Admin Server 130, which updates the bet status to "paid" in the Database Servers 105 using the DBUpdateBet Workflow 430.

Figure 5:
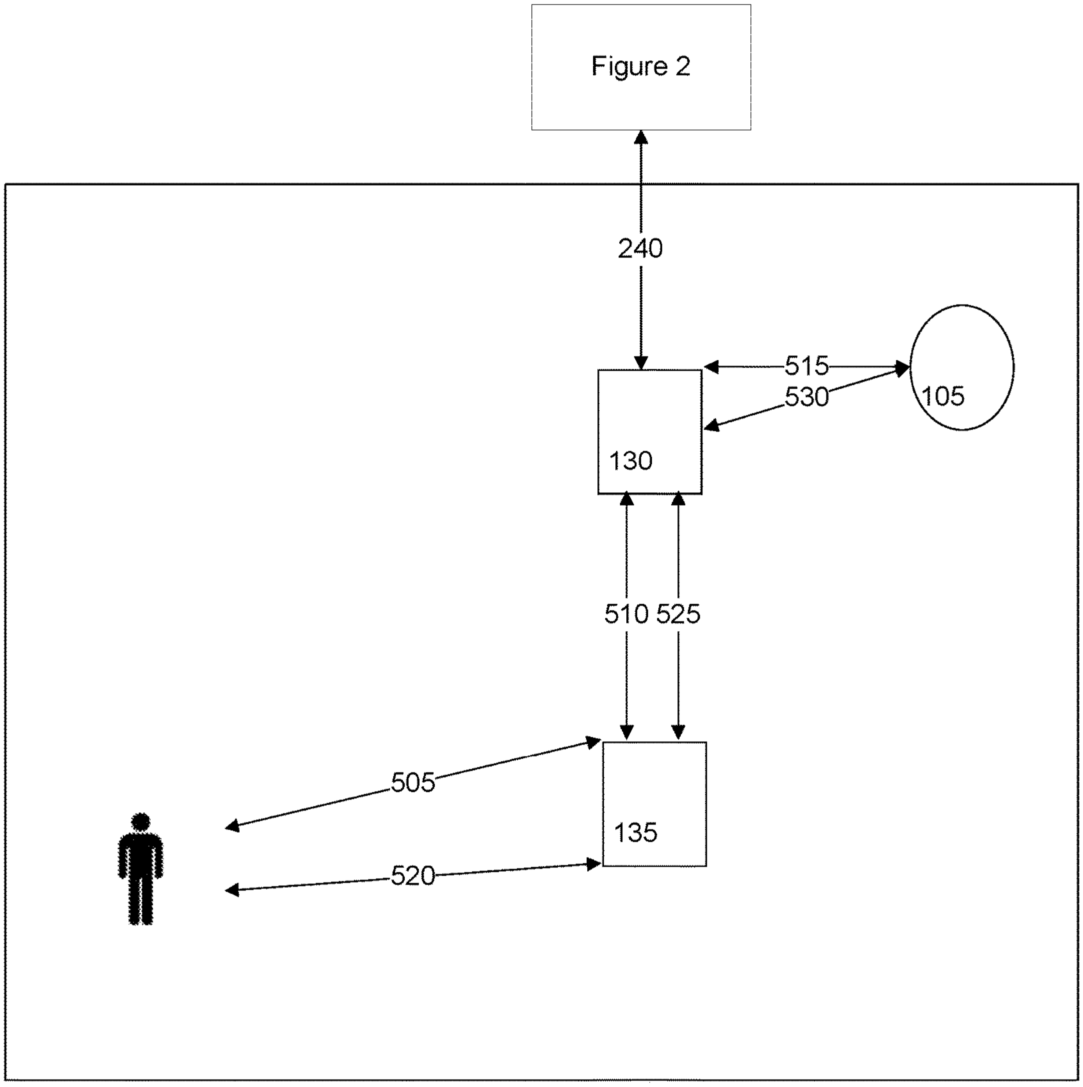

As shown in FIG. 5, the Admin Server 130, the System Computer Devices 135 and the Database Servers 105 operate to perform (or "execute") a plurality of high level customer work flows, including updating customer details in the database, and depositing and withdrawing funds associated with the account.

In a Customer Deposit/Withdraw Funds Workflow 505, the customer can deposit funds on their account by providing the operator with a deposit or withdrawal request. The operator, using the System Computer Devices 135, validates the request by counting the money for deposit requests, and then initiates a Deposit/Withdraw Funds Workflow 510 on the Admin Server 130. The operator can also use the System Computer Devices 135 to process a valid request to withdraw funds and initiate a Deposit/Withdraw Funds Workflow 510 on the Admin Server 130.

The Deposit/Withdraw Funds Workflow 510 is initiated on the Admin Server 130 by the Customer Deposit/Withdraw Funds Workflow 505, which intern initiates a DBUpdate Balance Workflow 515 to update the balance information in the Database Servers 105.

In the DBUpdate Balance Workflow 515, an associated request updates the customer balance with the information provided by the Admin Server 130 when the request/workflow is initiated.

Using the Customer Details Workflow 520, the customer can create an account or update their account details by providing their player information to the operator. The operator, using the System Computer Devices 135, validates the request to create or update the customer's account.

A validate request to insert/update the customer account is updated by issuing a Update Customer Details Workflow 525 to the Admin Server 130, which in turn posts the data into the Database Servers 105 using DBUpdate Customer Details Workflow 530.

In the DBUpdate Customer Details Workflow 530, this request updates the customer details with the information provided by the Admin Server 130 when the request is initiated.

The Admin Server 130 provides a process to authenticate a customer session. During the authenticated session, the Admin Server 130 receives the pre-defined subsequences based on user input from the player, and stores the subsequences in a customer account. The Admin Server 130 also receives the player preferences, represented by the preferences data, that are used during operation of the gaming method, including (but not necessarily limited to) a game-speed value that defines how rapidly the game outcomes are generated and displayed.

The overall gaming method includes drawing cards from the virtual card deck in each Card Server 120 until a game result is determined, then initiating post-game processing. The gaming method includes a plurality of game processes (also referred to as "sub-processes") executed by the components of the gaming system 100, including the processes (or "workflows") described hereinbefore.

Figure 6:
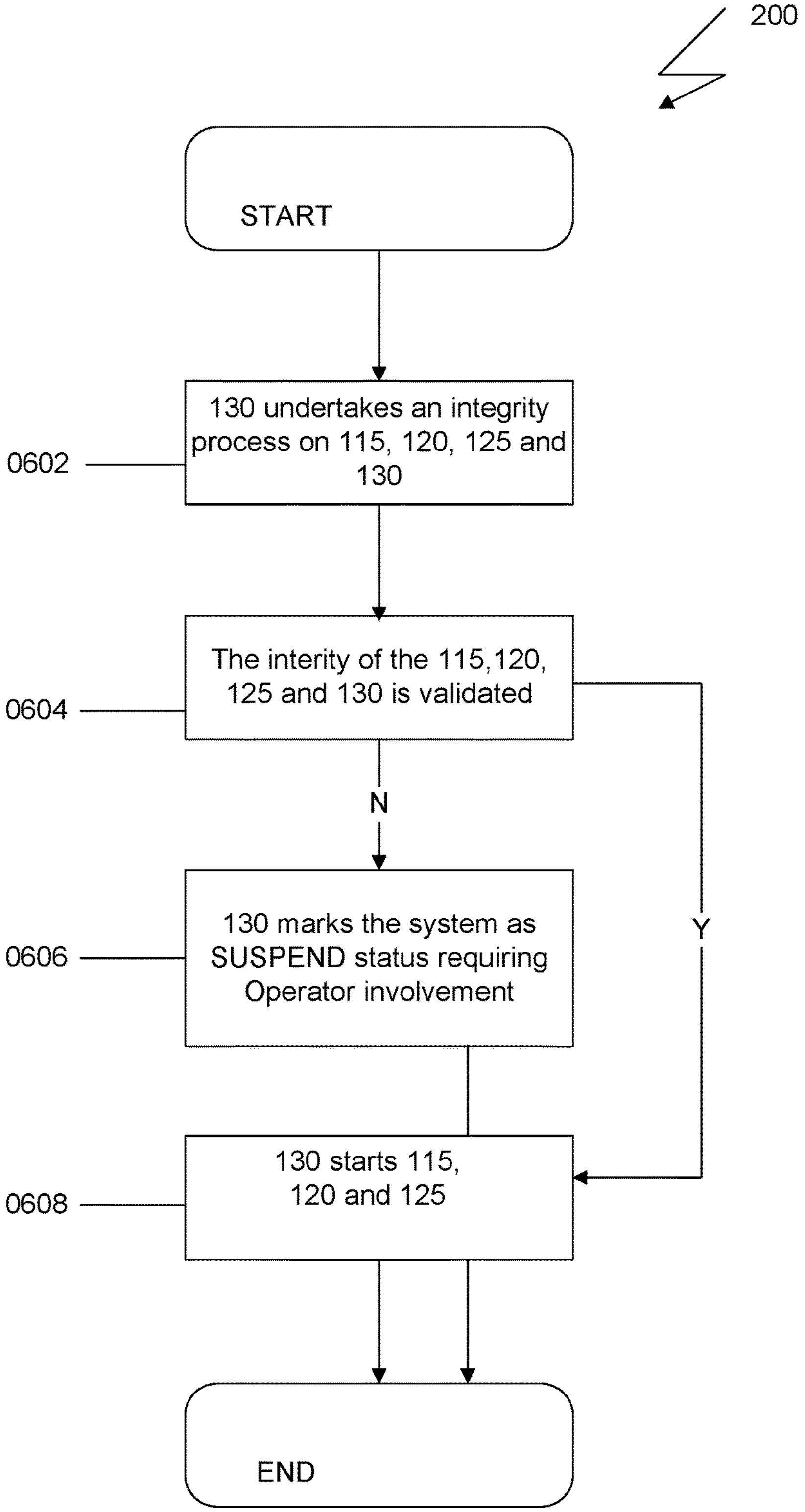
FIGS. 6 to 15 are flow charts of processes in a gaming method performed by the gaming system.

The gaming method includes an Initiation Process 200 (also referred to as a "system start-up process") performed by the Administration Server 130. As shown in FIG. 6, the Initiation Process 200 includes:

- executing an integrity process on the Game Server 115, the Card Servers 120, the Media servers 125, and the Administration Server 130 (including the Administration Module 110), including testing whether the components, code and configuration remain untampered (step 602);
- determining from the integrity process in step 602 whether the integrity of the Game Server 115, the Card Servers 120, the Media servers 125 and the Administration Server 130, was valid (step 604);
- if the integrity of one of the components in step 604 is determined to be invalid, entering a suspended status (also known as a "suspend" status), in which the gaming system 100 halts progress of the gaming method until an resume input is received by the Administration Server 130 from the administration user (step 606);
- if the integrity of all of the components in step 604 is determined to be valid, sending signals to the Game Server 115, the Card Servers 120, and the Media Servers 125, to commence operation respectively, and thus continue with the gaming method (step 608).

The Administration Module 110 executes a state machine process that stores a current state of the gaming system 100, including the suspend state. The states are: Open, Active, Closed, Suspended, and Stopped.

Figure 7:
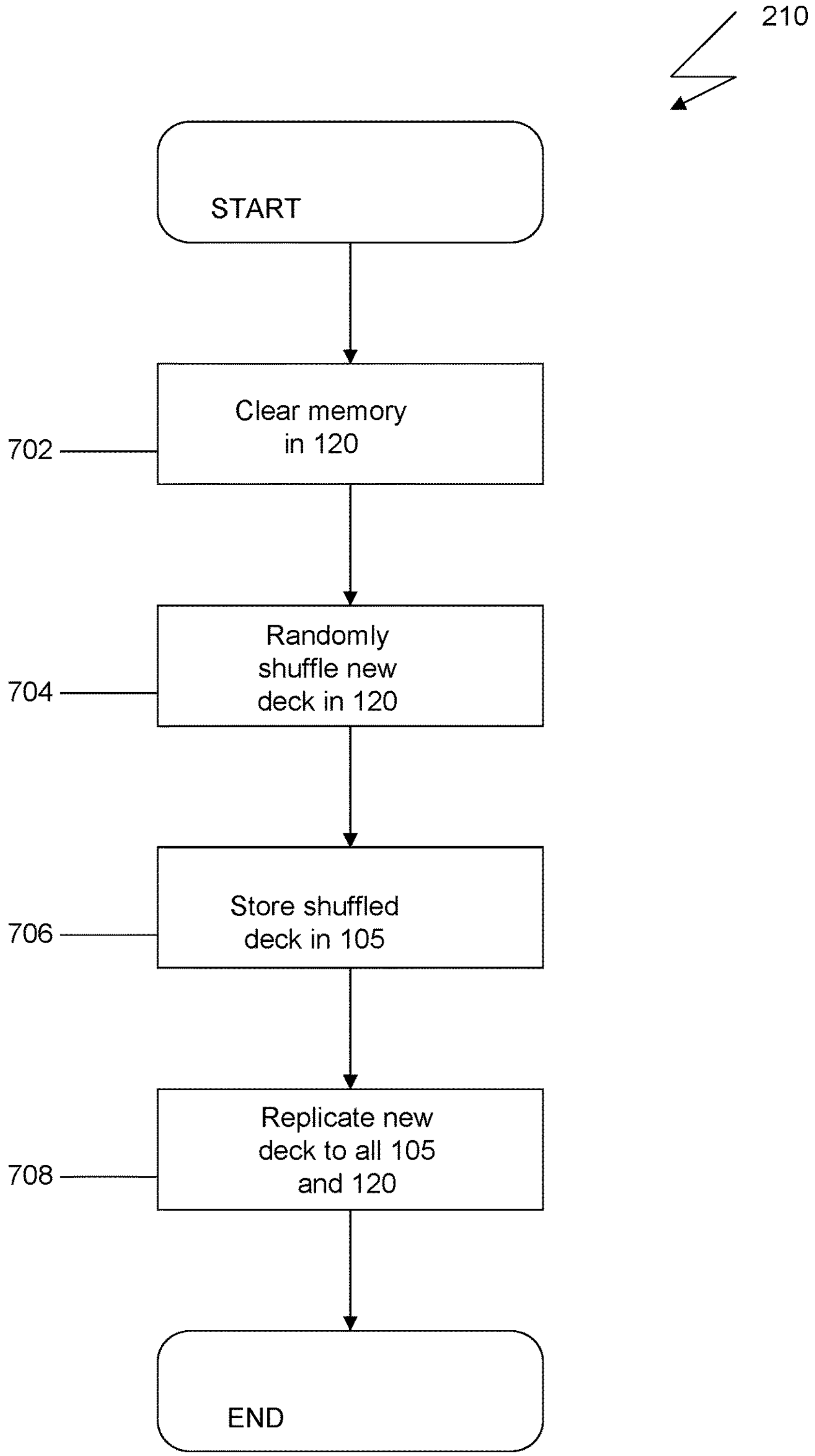

Following the Initiation Process 200, the gaming method includes the Shuffle Deck Process 210 performed by the Game Servers 115, the Database Servers 105, and the Card Servers 120. As shown in FIG. 7, the Shuffle Deck Process 210 includes:

- the Card Servers 120 clearing a part of its computer memory to store the virtual card deck (step 702);
- the Card Servers 120 performing a new card deck shuffle process, described hereinafter, to generate the shuffled virtual deck (step 704)
- the Card Servers 120 encrypting the shuffled virtual deck, and sending the encrypted shuffled virtual deck (represented by electronic signals and data) to the Game Servers 115, which in turn send the encrypted shuffled virtual deck to the Database Servers 105 (step 706); and
- the Database Servers 105 and the Game Servers 115 sending the encrypted shuffled virtual deck to the ones of the other Card Servers 120 and the other ones of the Database Servers 105 within the gaming network 195 (step 708).

At the end of the Shuffle Deck Process 210, each of the Database Servers 105 has the same virtual decks as the data are replicated across all database servers, and then kept in synchronicity.

In the new card deck shuffle process of step 704, the Card Servers 120 generate a random number (using a random number generator), and using that random number to generate deck data in a deck data structure representing the virtual card deck. The Card Servers 120 use the random number to select a virtual card from an unshuffled number of virtual decks (including 1 deck, 2 decks, up to 8 decks), and place it into the virtual card deck. The Card Servers 120 repeatedly generate further random numbers, and select corresponding random virtual cards for the virtual card desk, until the unshuffled decks are empty and all cards are placed into a shuffled virtual deck. In embodiments, the Card Servers 120 receive or load the virtual card deck, pre-shuffled, represented by data from an external source or external feed connected to the system 100. The pre-shuffled deck data can be generated by scanning a physical deck of cards, or by a series of random results from an electronic or physical random number generator.

Following the Initiation Process 200, the gaming method includes a Bet Creation Process performed by the Bet Kiosk 155, the Bet Terminal 150, the System Computer Devices 135, the Hotel TV 190, and the Administration Module 110. The Bet Creation Process may be performed at the same time and in parallel with, the Shuffle Deck Process 210, or before or after the Shuffle Deck Process 210: these events occur asynchronously, so players keep playing during the next shuffle. The Bet Creation Process includes:

- the Bet Kiosk 155 or the Bet Terminal 150 receiving funds and a user input from a customer; or the System Computer Devices 135 receiving funds and a user input from a customer using a completed Game Card 160 and assistance from a cashier (who enters data from the Game Card 160 and enters the funds);
- the Bet Kiosk 155, the Bet Terminal 150 or the System Computer Devices 135 receiving an input representing a validate selection per the game rules, described hereinafter;
- the Bet Kiosk 155, the Bet Terminal 150 or the System Computer Devices 135 validating the funds, and confirming the selection, by the Bet Kiosk 155 and the Bet Terminal 150 using a cash acceptor to validate the money amount and the player selection before submitting (or "activating") the bet, or by the System Computer Devices 135 accessing admin components that validate the bet is entered correctly, and receiving input from the cashier to validate the funds are correct before entering (or "activating") the bet;
- if the funds and the selection are valid, the Bet Kiosk 155, the Bet Terminal 150 or the System Computer Devices 135 creating an active customer bet (or "active bet") which enables the customer to participate in a game method.

The active bet is data which is sent to and inserted into the Database Servers 105. Once the active bet data is in the Database Servers 105, the Winning Bets Process 240 is initiated.

Figure 8:
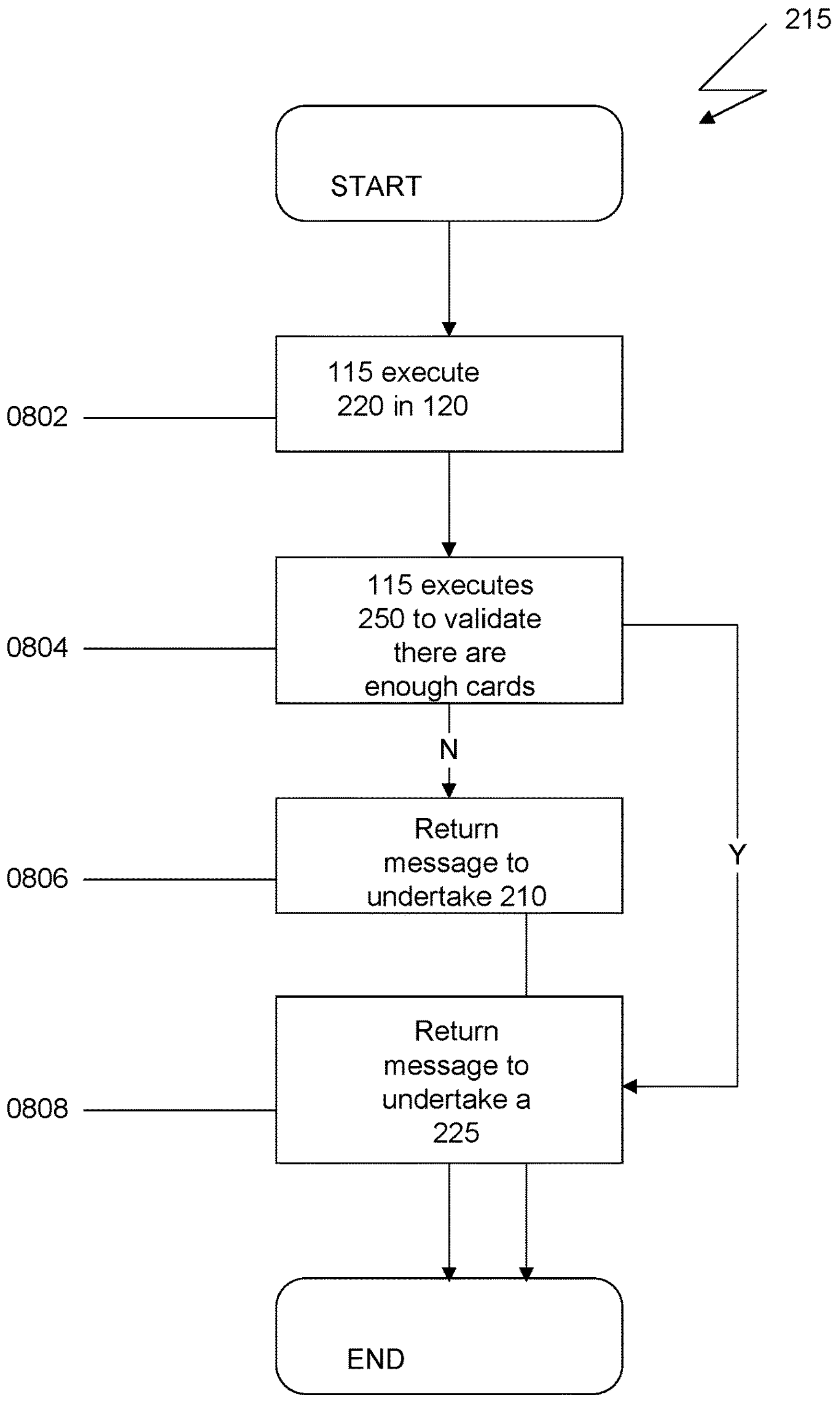

Following the Shuffle Deck Process 210 and the Bet Creation Process, the gaming method includes the Execute Game Process 215 performed by the Game Servers 115 and the Card Servers 120. As shown in FIG. 8, the Execute Game Process 215 includes:

- the Game Servers 115 initiating the Draw Card Process 220, described hereinafter, in the Card Servers 120, with a time delay between iterations of the Draw Card Process 220 that is based on the game-speed value (step 802);
- the Game Servers 115 executing the Card Validation Process 250, described hereinafter, to assess whether there are enough cards available in the virtual deck in the Game Servers 115 to complete a game: the Game Server decides on the number of cards to be drawn as it holds the rules of the standard game, e.g., Baccarat, which determines whether there are 4, 5 or 6 cards drawn (i.e., a minimum of four and maximum of six for a single hand of Baccarat) based on the total amounts for the Banker and Player (step 804);
- if the Card Servers 120 determine that there are not enough cards available in the virtual deck to complete a game based on the Card Validation Process 250 in step 804, the Card Servers 120 provide a response message to the Game Servers 115 to return to the Shuffle Deck Process 210, described hereinbefore (step 806);
- if, on the other hand, the Card Servers 120 determines that there are enough cards available in the virtual deck to complete a game based on the Card Validation Process 250 in step 804, the Card Servers 120 provide a response message to the Game Servers 115 to continue the gaming method by performing the Game Return Process 225 described hereinafter (step 808).

The pre-defined game rules require that, at a minimum, each Active Bet represents two or more runs, a run type, a number of games, and a wager amount per run. Each run represents a plurality of results of a plurality of plays of the standard game, e.g., of Baccarat. An example run can represent the following predicted results of eight Baccarat games: Banker, Banker, Player, Player, Tie, Tie, Banker, Banker. To select the Active Bet data, the player selects a number of the runs, selects the run types (including any individual selections and pre-defined sequences), and sets the amount. The predicted sequence of outcomes can be generated by receiving a sequence length and one of the possible game outcomes for all of the sequence. Alternatively, or additionally, the predicted sequence of outcomes is generated by receiving a selection of one or more pre-defined subsequences, each subsequence including a plurality of pre-selected outcomes. As mentioned above, each predicted outcome can be selected independently from the possible outcomes of the game, or a group of predicted outcomes can be selected as a pre-defined subsequence or nominated pattern. Example pre-defined subsequences include one-outcome runs (including a Run of Bankers, a Run of Players, and a Run of Ties) and mixed-outcome runs (including BPBPBPBP, and PBPBPBPB).

Figure 9:
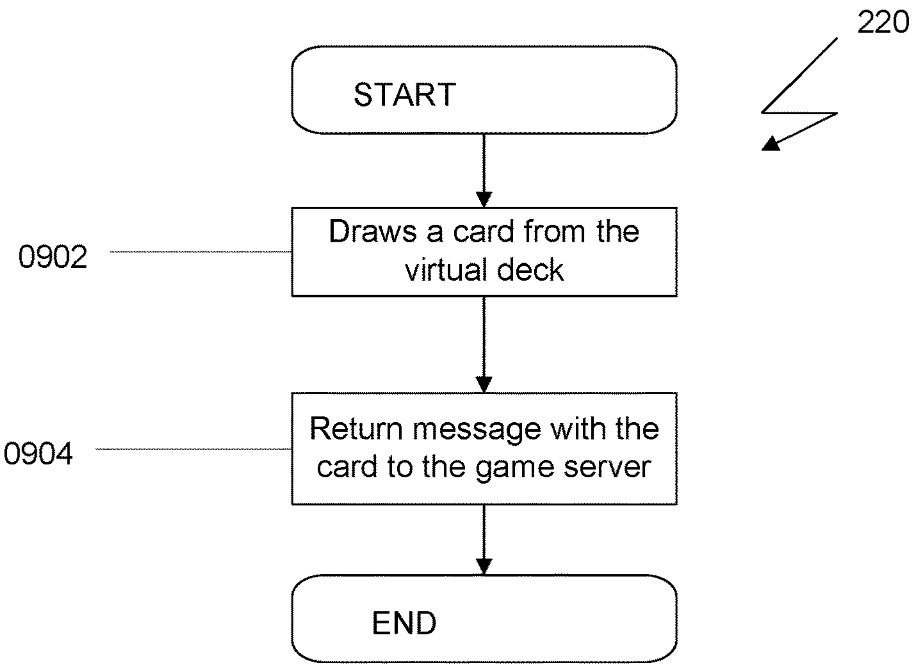

The gaming method includes the Draw Card Process 220 in step 802 of the Execute Game Process 215. As shown in FIG. 9, the Draw Card Process 220 includes:

- the Card Servers 120 drawing a card from the virtual deck (step 902); and
- the Card Servers 120 sending a drawn-card message to the Game Servers 115 with data representing the drawn card (step 904).

Figure 10:
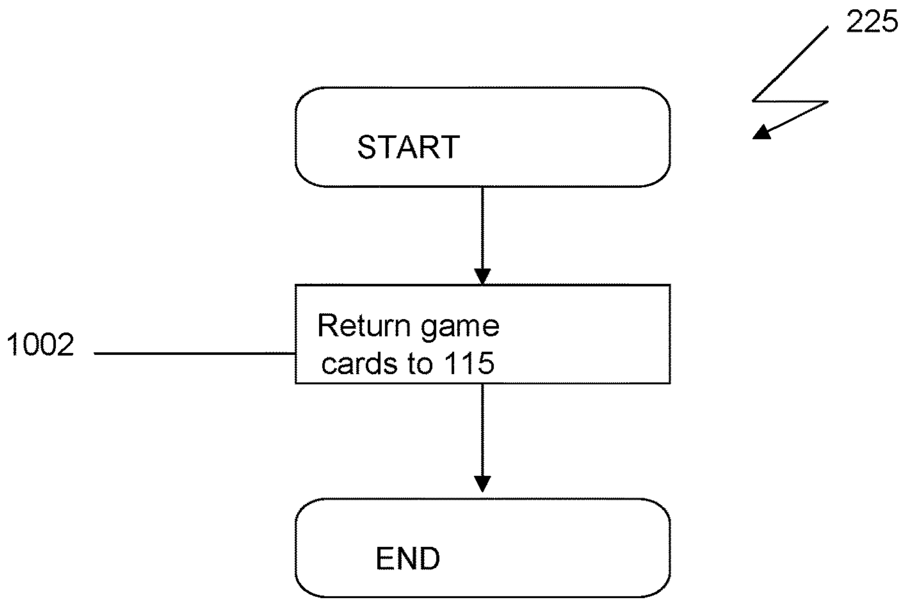

The gaming method includes the Game Return Process 225 in step 808 of the Execute Game Process 215. As shown in FIG. 10, the Game Return Process 225 includes: the Game Servers 115 providing the drawn cards from the Draw Card Process 220 generated from the Draw Card Process 220 (step 1002).

Figure 11:
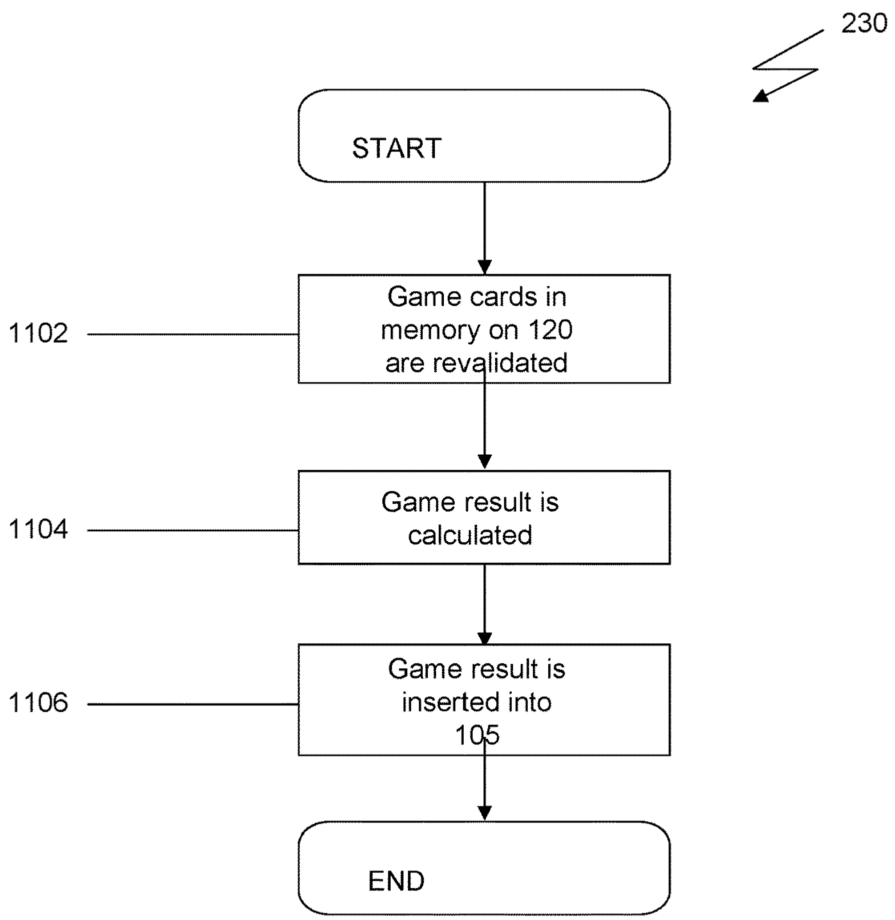

Following the Execute Game Process 215, the gaming method includes the Post Game Process 230 performed by the Card Servers 120 and the Database Servers 105. As shown in FIG. 11, the Post Game Process 230 includes:

the Card Servers 120 continuously validating (or "revalidating", when a card is drawn, or deck shuffled), through a checksum algorithm, that the virtual deck and received game cards that are stored in its computer memory have not been altered (step 1102);

the Card Servers 120 determining a game result using the configured games rules stored in the Database Servers 105, and generating a win signal for each of the predicted sequences (in the wagers) in the Database Servers 105 that matches the results sequence (i.e., the drawn card sequence) (step 1104); and the Card Servers 120 inserting the determined game result into the Database Servers 105 (step 1106).

The Card Servers 120 can be referred to as an "outcome generator" because the Card Servers 120 determine the game results using the configured games rules, and thus generate each outcome (e.g., Win, Loss, Tie) from each plays of the standard game. The Card Servers 120 select the game outcome events from the set of pre-defined possible game outcomes (e.g., Win, Loss and Tie) defined by the pre-defined game rules. The outcomes from the standard game from step 1104, together with the drawn cards from step 904, are displayed sequentially on the display devices, using the Media Event Process 235, shortly after generation.

The results sequence is generated by substantially periodic or periodic iterations of the Post Game Process 230.

Figure 12:
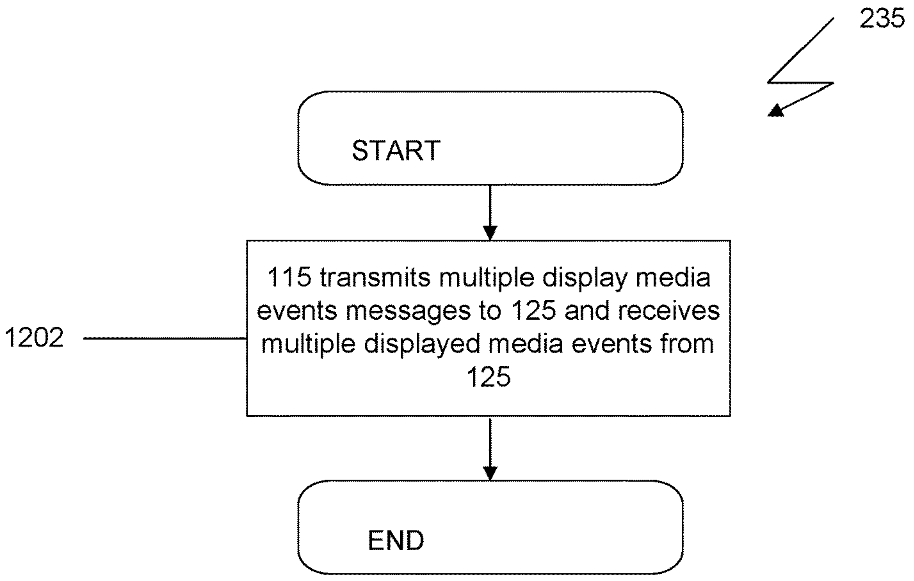

Following the Post Game Process 230, the gaming method includes the Media Event Process 235 performed by the Game Servers 115 and the Media Servers 125. As shown in FIG. 12, the Media Event Process 235 includes:

the Game Servers 115 transmitting one or more system-generated messages, which are generated automatically by the system 100, and which include win messages (indicating whether the results comparator has generated a win signal or a no-win/loss signal), running-update messages (representing determined game results from the standard game and impending potential winning results), game-participation messages (indicating the number of active players in the gaming system 100), and accrued-prize message (including accrued prize values over a plurality of games in the gaming system 100), and/or one or more administrator-generated messages including multi-media content (including photographs, videos, text, and/or audio recordings: the multi media content is stored on the Media Servers 125, uploaded by the administrator, and the Game Servers 115 send text to the Media Servers 125) to the Media Servers 125 for incorporating in the media streams from the Media Servers 125; and the Media Servers 125 receiving the system-generated messages, the administrator-generated messages and the customer-generated messages, validating these messages (including multi-media content) using processes (e.g., packet analysis) that determine whether the media items require review by an administrator user, and displaying the media stream comprising the validated messages (step 1202).

Using the Media Event Process 235, shortly after generation of the game outcome events, they are displayed on the display devices. For example, each virtual card is displayed shortly after is it drawn in step 902.

In the Media Event Process 235, the Game Servers 115, by accessing the "Open" bets in the Database Servers 105, generates and sends data representing the impending potential winning results to the connected Media Servers 125 for display: this potential winning-result data is generated if the sequence of game outcome events from the Card Servers 120 (in the Post Game Process 230) matches an initial portion of the predicted sequence of events. The initial portion includes a plurality of the predicted events. The potential winning-result data can be generated based on the fraction of the predicted sequence in the initial portion: for a low fraction (representing just the first few predicted events), the potential winning-result data may represent a low-impact message, whereas for a high fraction (representing from around 70% to under 100% of the predicted sequence of events), the potential winning-result data may represent a high-impact message. The potential winning-result data can be referred to as representing an "approaching" win.

Figure 13:
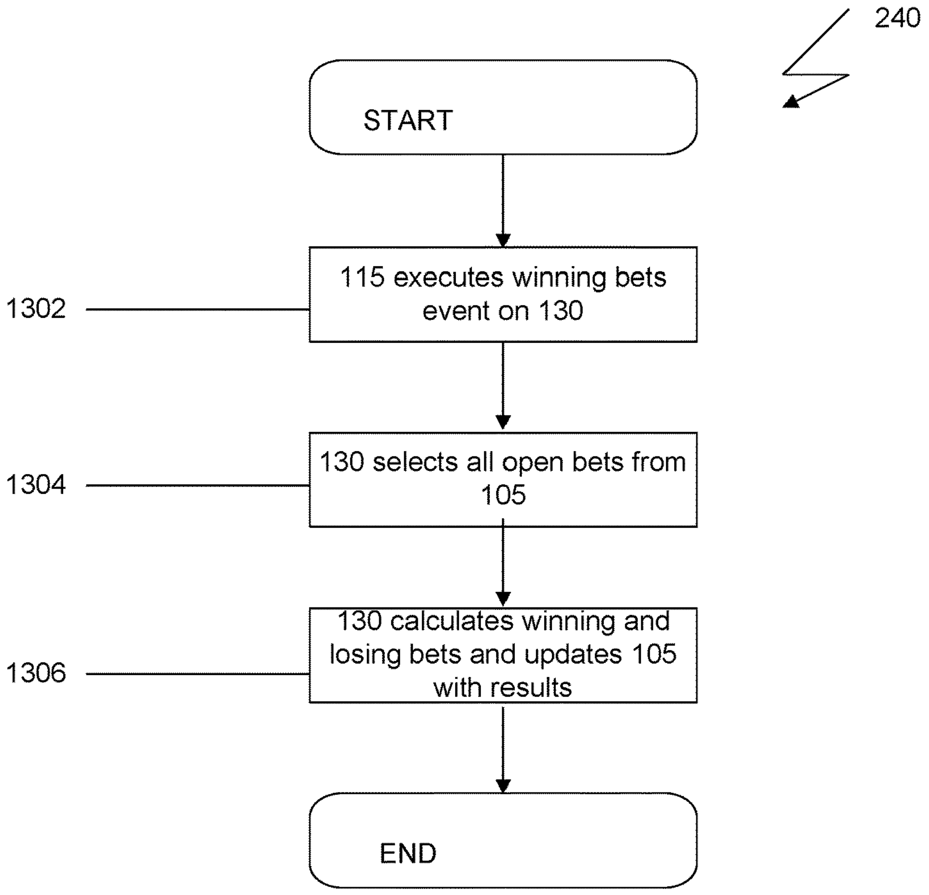

Following the Media Event Process 235, the gaming method includes the Winning Bets Process 240 performed by the Game Servers 115 and the Administration Server 130. As shown in FIG. 13, the Winning Bets Process 240 includes:

the Game Servers 115 executing a winning bets event on the Administration Server 130 using a winning bets component (step 1302);

the Administration Server 130 accessing all open bets (i.e., bets in the Database Servers 105 with a status of "Open") from the Database Servers 105, and storing the open bets in the memory of the Administration Server 130 (step 1304);

the Administration Server 130 working sequentially through the stored open bets to determine which of the open bets are winning bets and which are losing bets (by comparing the predicted runs with the recorded actual runs of results of the standard game), storing the winning bets and losing bets in the memory of the Administration Server 130, and transmitting the winning bets and the losing bets to the Database Servers 105 for storage (step 1306).

The Administration Server 130 may be referred to as a "results comparator" because it compares the results sequence with the predicted sequences (i.e., the wagers) in the Winning Bets Process 240. The results sequence can match the one or more of the predicted sequences stored in the wager database (provided by the Database Servers 105) if the results sequence is identical to the one or more of the predicted sequences stored in the wager database.

Figure 14:
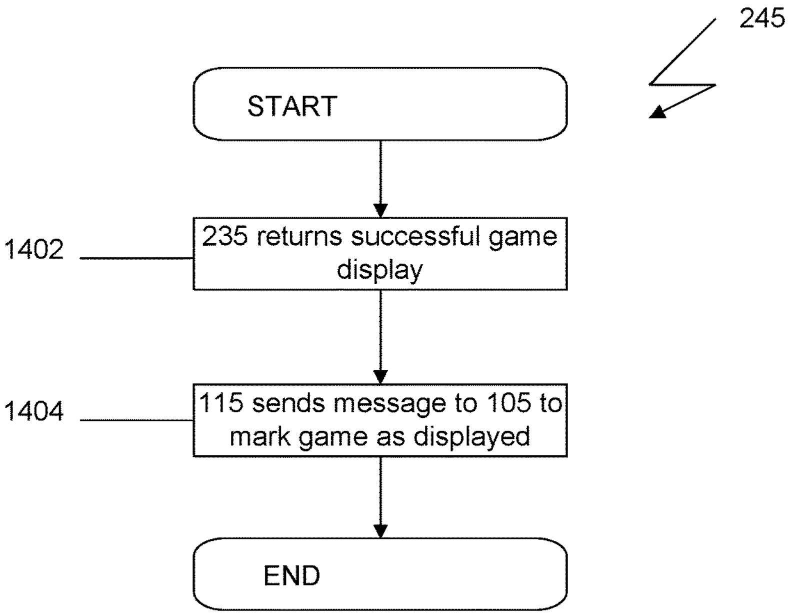

Following the Winning Bets Process 240, the gaming method includes the Post Display Game Process 245 performed by the Game Servers 115 and the Database Servers 105. As shown in FIG. 14, the Post Display Game Process 245 includes:

the Game Servers 115 receiving a successful game display message (an acknowledgement message from the Media Servers 125: when the game result is displayed by a display device, the device sends a message back to the Game Servers 115 to state it has been displayed, which is stored in the Database Servers 105) from the Media Servers 125 if the media was successfully displayed in step 1202 of the Media Event Process 235 (step 1402); and the Game Servers 115 sending a message to the Database Servers 105 to update database records to record (or flag) that the game has been displayed (step 1404).

The Game Servers 115 are referred to as a "win notifier" because the Game Servers 115 send win indications for display on the plurality of displays, in response to receiving the win signal from the Card Servers 120.

When the Winning Bets Process 240 generates a winning result, data representing the winning result is sent by the Game Servers 115 to the connected Media Servers 125 for display. This winning-result data can represent a photograph of the customer, which can be generated using a camera in one of the wager receivers from an external source, such as a digital camera or personal electronic device (including a smart phone) in communication with the wager receivers, controlled by the customer.

Each play of the standard game has a unique identifier (ID). At the end of the draw-cards event, when enough cards are drawn, the game is posted into the Database Servers 105, and the state of the game is “Locked” (new state). The game results and ID are sent to the Media Servers 125 to display the result across the displayed devices, and the display devices return a positive acknowledgement to state the result has been displayed correctly.

Figure 15:
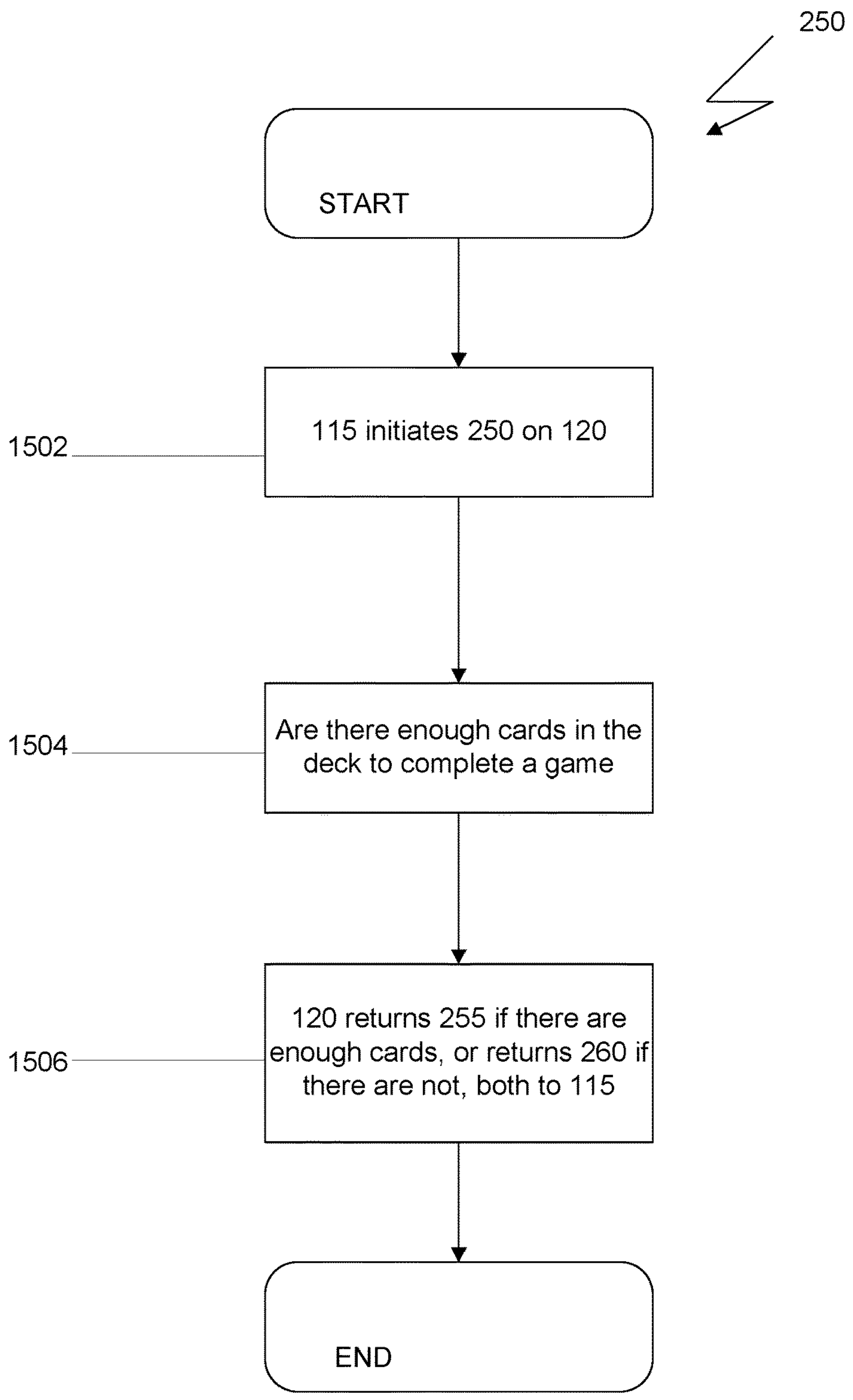

The gaming method includes the Card Validation Process 250 performed by the Game Servers 115 and the Card Servers 120 in a plurality of the processes described hereinbefore. As shown in FIG. 15, the Card Validation Process 250 (also referred as a “card validation decision process”) includes:

- the Game Servers 115 initiating Card Validation Process 250 on the Card Servers 120 (step 1502);
- the Card Servers 120 validating (determining) the number of cards left in the deck, including to ensure there are at least 10 cards in the deck so a single hand of the standard game can be played (step 1504); and
- the Card Servers 120 generating and returning a validation message to the Game Servers 115: the validation message is a “valid” message (e.g., card validation Yes, or “Y”) if step 1504 determined that there were enough cards to complete the next game; and the validation message is an “invalid” message (e.g., card validation No, or “N”) if step 1504 determined that there were not enough cards to complete the next game (step 1506).

The gaming method includes a Bet Events Process, which includes the Administration Server 130 sending and receiving a plurality of bet events to and from the System Computer Devices 135, the Bet Terminals 150, the Bet Kiosks 155, the Interactive TVs 185, and the Database Servers 105. The bet events include a range of messages and function-call requests to the Admin Server 130, and the Admin Server 130 returns requested data sets, status, and/or an error to be managed by the local device.

The gaming method includes a Customer Events Process, which includes the Administration Server 130 sending and receiving a plurality of customer events (similar in structure and transmission to bet events) to and from the System Computer Devices 135 and the Database Servers 105.

When executed by the gaming system 100, the gaming method is executed continuously, with the game outcome events and game outcomes being generated continuously, regardless of player actions: an example of the gaming system 100 can generate a game outcome event (which can be a freshly drawn card) periodically or regularly, e.g., every 15 second, or at least on a plurality of occasions every minute.

The gaming method can be executed by an electronic gaming machine (EGM) 1600 including a standalone unit with an integrated EGM display. The EGM 1600 includes computer components that are configured to execute processes equivalent to those of the Game Servers 115 and the Card Servers 120, and so does not need to receive data representing game outcome events from the Game Servers 115 and the Card Servers 120: each instance of the EGM 1600 can conduct its own instance of the gaming method independently of other instances of the EGM 1600 and of the Game Servers 115 and the Card Servers 120.

The EGM 1600 can be connected to the gaming system 100 to send data for the customer message to the Media Servers 125, and to receive the media stream for display on the EGM display. A plurality of these connected EGMs can form an EGM network that allows the respective players to communicate with each other by sending the media stream to all of the networked EGMs. The EGM 1600 can be connected to the gaming system 100 for a player to access and enter the player information by establishing the authenticated session from the EGM 1600. The EGM 1600 can be configured to communicate electronically with the Database Servers 105, the Admin Server 130 and/or the Media Servers 125, that together interact with the EGM 1600 to provide the media stream, and access to the player’s player preferences, while the EGM 1600 conducts the gaming method.

Figure 16:
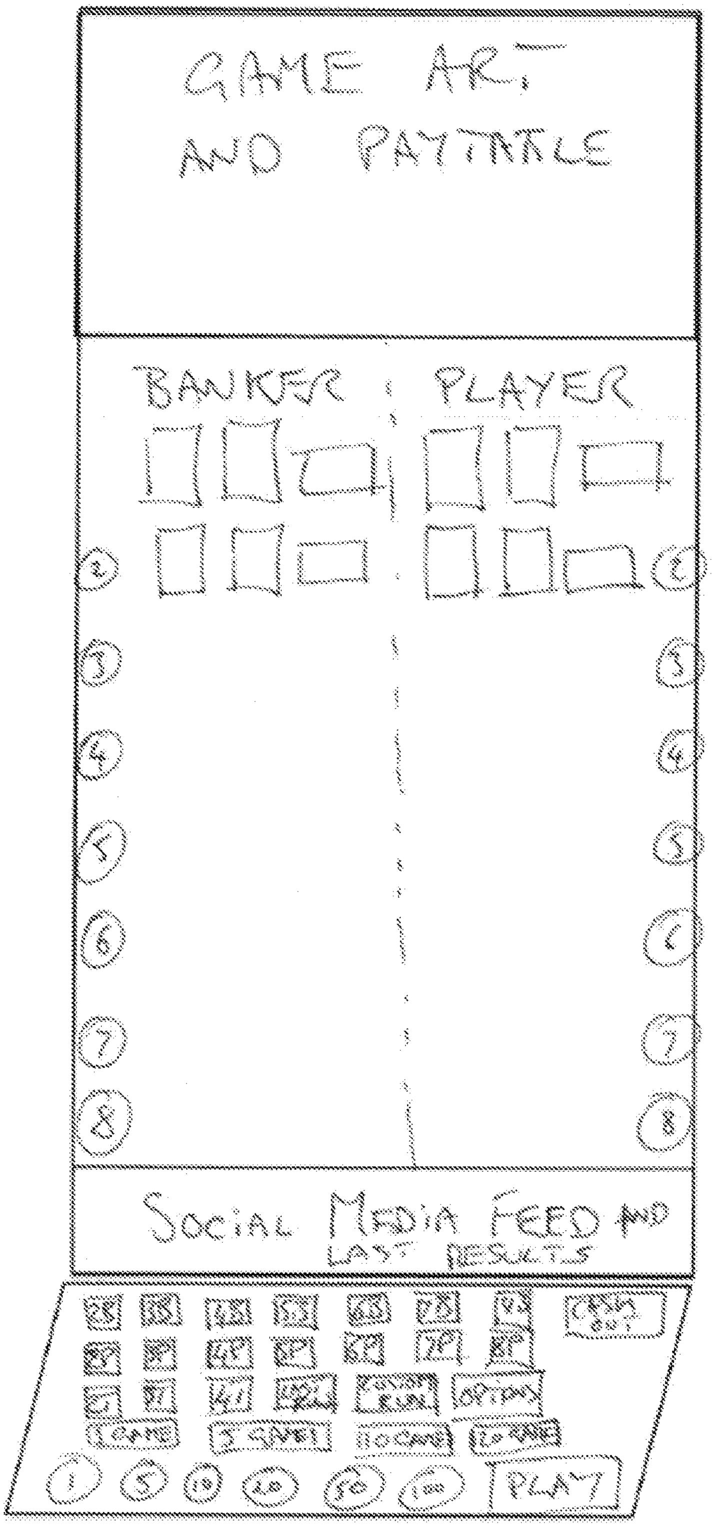
FIG. 16 is a sketch of an electronic gaming machine (EGM) configured to provide the gaming method.

As shown in FIG. 16, the EGM display includes one or more electronic display screens, and at least one of the display screens has eight rows that run from top to bottom, and spin top to bottom by row. Seven of the rows are labelled “2” to “8”. Each reel can represent a play of a standard game, e.g., Baccarat. For example, if a player bets on a run of 5 Bankers, rows 2, 3, 4 and 5 spin individually; then row 2 displays a random result; then row 3 displays a random result; then row 4 displays a random result; then row 5 displays the random result. If the result of row 2, row 3, row 4 has a Player result then the game ends. Each row can be split to show Banker cards on one side (the left) and Player cards on the other side (on the right), representing cards laid out in order on a virtual table. Winning runs are paid per the same pay table as in the processes performed by the gaming system 100 described hereinbefore.

The EGM 1600 can include a plurality of rows corresponding to different plays of the standard game. The top row can display the first play, and the results (cards) of the first play can remain on display while the second and subsequent rows are used for the second and subsequent plays. There may be 8 rows, showing the results of 8 plays. In this way, the history of the plays is displayed, and thus the actual sequence or run is visible all at once: the player can visually compare the actual run with their predicted run to confirm whether they have won.

The gaming method executed by the EGM 1600 includes steps of:

- receiving electrical power;
- running a self-check to validate the integrity of game code in the EGM 1600, thus determining whether the game code is corrupt (which is equivalent to the integrity process performed in the gaming system 100, described above in step 602);
- if the game code is determined to be corrupt, requesting to download a new game code, or entering maintenance mode for a technician to manually install the new game code;
- starting up, displaying a game screen including the RUN rows and the paytable, and enabling the betting buttons, the card readers and the note reader;
- a user input apparatus of the EGM 1600 receiving player inputs to generate the preferences data, and storing the preferences data in a wager database of the EGM 1600 (or the Database Servers 105);
- a wager receiver of the EGM 1600 receiving money from the player (including cash, cashless transaction or cash equivalent);

the user input apparatus receiving a valid selection from the player that defines at least one sequence (also referred to as a "RUN", e.g., 4 Bankers) and the corresponding wager amount (in credits or cash);

the wager database of the EGM 1600 (or the Database Servers 105) storing the RUN or RUNs;

the user input apparatus receiving a game-start input, which can be a button push, an outcome generator of the EGM 1600 determining a required number of game outcome events for the length of the selected RUN or sum of the lengths of a plurality of selected RUNS;

a random number generator (RNG) of the EGM 1600 randomly generating a card virtual deck (which can be 52 cards), or a plurality of decks; or randomly generating a random numbers for each of the required number of game outcome events (which can be 6 cards for each game outcome event);

the outcome generator determining outcomes for the determined number of game outcome events, which can include drawing one or more of the cards for each game outcome event, and determining a winning result based on the pre-defined game rules (which can be Banker, Player or Tie, for Baccarat rules);

a results comparator of the EGM 1600 comparing the results sequence with the predicted sequences of outcomes stored in the wager database (i.e., determining a game result for each RUN), and generating a win signal if the results sequence matches one or more of the predicted sequences stored in the wager database;

storing each game result locally in non-volatile electronic memory in the EGM 1600;

sending a message to an EGM server (which can be one of the Database Severs 105) to record each game result for accounting and marketing purposes;

generating and displaying images and/or text representing the RUNS, in accordance with the preference data and win/loss amounts associated with the RUNS;

adjusting the player account (representing credits or cash balance) based on the RUN win/loss results; and repeating the above steps, from step of the user input apparatus receiving the valid selection that defines at least one sequence, until the player cashes out their balance or runs out of credits/cash in the account.

During the game method, the outcome generator can generate the plurality of outcomes for the EGM display to display first 4 cards, then displaying 5th and 6th cards per the rules of Baccarat.

When the EGM 1600 generates a winning result, it sends data representing the winning result to the connected Media Servers 125 for display. This winning-result data can represent a photograph of the customer, which can be generated using a camera in the EGM 1600, or received by the EGM 1600 from an external source, such as a digital camera or personal electronic device (including a smart phone) in communication with the EGM 1600, controlled by the customer, or a social media server controlled by the customer (e.g., a Facebook server). The EGM 1600 also generates and sends data representing the impending potential winning results to the connected Media Servers 125 for display: this potential winning-result data is generated if the sequence of game outcome events in the EGM 1600 matches an initial portion of the predicted sequence of events, as described hereinbefore.

The EGM 1600 includes a bottom display or a side display or a top display with a plurality of the last results (which can be 100 results) at the bottom or side or top of the screen. The EGM 1600 includes a paytable display with the pay table, together with a game title and game art, at the top of the screen.

When executed by the EGM 1600, the gaming method is executed discontinuously, with the game outcome events and game outcomes being generated in response to player actions: an example of the EGM 1600 can generate a game outcome event (which can be a freshly drawn card) in response to a player activating a control on the EGM 1600, which can occur at any time, i.e., aperiodically or irregularly.

The servers in the system 100—including the Card Servers 120, the Game Servers 115, the Admin Server 130, the Computer System Devices 135 and the Media Servers 125—and the EGM 1600, include server computer systems based on a 32-bit or 64-bit architectures, and the processes executed or performed by the server computer systems are implemented in the form of programming instructions of one or more software components stored on non-transitory, non-volatile (e.g., hard disk) computer-readable storage of the server computer systems, and/or modules implemented as one or more dedicated hardware components, such as application-specific integrated circuits (ASICs) and/or field programmable gate arrays (FPGAs). The server computer systems include network interface connectors connected to data communications networks for data communications in the system 100.

Each of the steps of the processes and workflows may be embodied in software components that are machine-readable and stored in a computer-readable medium, and are read by the server computer systems for executing the processes. The data generation, data storage and data communications operations relate to digital data operations. The digital data may include electronic data defined by logic circuits—which may include binary logic circuits—represented by electronic quantities, which may include voltage, current and/or resistance.

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:

1. A gaming system including:

a wager receiver for receiving a plurality of wagers, each wager identifying a corresponding predicted sequence of outcomes representing a time-dependent order of occurrence of respective game outcome events, and each of the predicted sequences of outcomes being stored in a wager database;

an outcome generator for generating a results sequence of game outcome events, the game outcome events of the results sequence being generated sequentially and displayed on one or more displays;

a results comparator for comparing the results sequence with the predicted sequences of outcomes stored in the wager database, and generating a win signal if the results sequence matches one or more of the predicted sequences stored in the wager database; and a win notifier for generating a win message for displaying a win indication on the displays in response to receiving the win signal.

2. The system of claim 1, wherein the gaming system further includes a player information receiver for generating player information data related to a player and the received player information data with the wager, wherein the player information data include preferences data representing player preferences selected from game options in the gaming system.

3. The system of claim 2, wherein the player information includes authentication details used by the player to communicate with the system and other players in the gaming system.

4. The system of claim 1, further including one or more media servers that receive the win message from the win notifier, and that generate display signals, for the displays, representing the win indication.

5. The system of claim 4, wherein the media servers receive running-update messages from the win notifier for displaying on the displays.

6. The system of claim 4, wherein the media servers receive player-generated messages based on data from an input apparatus for displaying on the displays.

7. The system of claim 1, wherein the wager receiver, the outcome generator, the results comparator, and the win notifier are housed together in an electronic gaming machine (EGM) unit.

8. The system of claim 1, wherein the predicted sequence of outcomes is generated by receiving a sequence length and one of the possible game outcomes for all of the sequence.

9. The system of claim 1, wherein the predicted sequence of outcomes is generated by receiving a selection of one or more pre-defined subsequences, each subsequence including a plurality of pre-selected outcomes.

10. A gaming method including steps of:

receiving a plurality of wagers, each wager identifying a corresponding predicted sequence of outcomes representing a time-dependent order of occurrence of respective game outcome events, and each of the predicted sequences of outcomes being stored in a wager database;

generating a results sequence of game outcome events, the game outcome events of the results sequence being generated sequentially and displayed on one or more displays;

comparing the results sequence with the predicted sequences of outcomes stored in the wager database, and generating a win signal if the results sequence matches one or more of the predicted sequences stored in the wager database; and generating a win message for displaying a win indication on the displays in response to receiving the win signal.

11. The gaming method of claim 10, further including steps of:

generating player information data related to a player; and associating the received player information data with the wager, wherein the player information data include preferences data representing player preferences selected from game options in the gaming system.

12. The gaming method of claim 11, wherein the player information includes authentication details used by the player to communicate with the system and other players in the gaming method.

13. The gaming method of claim 10, further including steps of:

receiving the message from the win notifier; and generating display signals, for the displays, representing the win indication.

14. The gaming method of claim 13, further including the step of receiving running-update messages from the win notifier for displaying on the displays.

15. The gaming method of claim 13, further including the step of receiving player-generated messages based on data from an input apparatus for displaying on the displays.

16. The gaming method of claim 13, wherein the gaming method is executed by an electronic gaming machine (EGM) unit.

17. The gaming method of claim 10, wherein the predicted sequence of outcomes is generated by receiving a sequence length and one of the possible game outcomes for all of the sequence.

18. The gaming method of claim 10, wherein the predicted sequence of outcomes is generated by receiving a selection of one or more pre-defined subsequences, each subsequence including a plurality of pre-selected outcomes.

19. An electronic gaming machine including:

a wager receiver for receiving a plurality of wagers, each wager identifying a corresponding predicted sequence of outcomes representing a time-dependent order of occurrence of respective game outcome events, and each of the predicted sequences of outcomes being stored in a wager database;

an outcome generator for generating a results sequence of game outcome events, the game outcome events of the results sequence being generated sequentially and displayed on one or more displays;

a results comparator for comparing the results sequence with the predicted sequences of outcomes stored in the wager database, and generating a win signal if the results sequence matches one or more of the predicted sequences stored in the wager database; and a win notifier for generating a win message for displaying a win indication on the displays in response to receiving the win signal.

20. A non-transitory computer-readable storage with instructions configured to perform the gaming method of claim 10.

* * * * *